(12) United States Patent
Maeda et al.

(10) Patent No.: US 8,556,048 B2
(45) Date of Patent: Oct. 15, 2013

(54) HYDRAULIC SHOCK ABSORBER

(75) Inventors: Atsushi Maeda, Yokohama (JP); Reiji Nakagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1401 days.

(21) Appl. No.: 12/068,301

(22) Filed: Feb. 5, 2008

(65) Prior Publication Data

US 2008/0185244 A1  Aug. 7, 2008

(30) Foreign Application Priority Data

Feb. 7, 2007  (JP) .................................. 2007-28248

(51) Int. Cl.
F16F 9/14 (2006.01)
(52) U.S. Cl.
USPC ........................................ 188/315; 267/64.17
(58) Field of Classification Search
USPC ............... 188/298, 313–314, 315; 267/64.11, 267/64.15–64.17
See application file for complete search history.

(56) References Cited

U.S. PATENT DOCUMENTS

| | | | | |
|---|---|---|---|---|
| 3,593,978 A * | 7/1971 | Lohr | ........................... | 267/64.17 |
| 3,799,528 A * | 3/1974 | Allinquant et al. | ........ | 267/64.17 |
| 3,837,444 A * | 9/1974 | Allinquant et al. | ........... | 188/315 |
| 4,284,178 A * | 8/1981 | Tomita et al. | ................. | 188/281 |
| 5,564,680 A * | 10/1996 | Sano et al. | ................. | 267/64.17 |
| 5,988,655 A * | 11/1999 | Sakai et al. | ................. | 280/6.159 |
| 6,202,993 B1 * | 3/2001 | Wilms et al. | .................. | 267/136 |
| 6,494,442 B2 * | 12/2002 | Beck et al. | ................. | 267/64.17 |
| 7,370,849 B2 * | 5/2008 | Beck | ........................... | 267/64.17 |

FOREIGN PATENT DOCUMENTS

| | | |
|---|---|---|
| JP | 9-42362 | 2/1997 |
| JP | 9-144801 | 6/1997 |
| JP | 10-138730 | 5/1998 |

OTHER PUBLICATIONS

Japanese Office Action (with English translation) issued Sep. 14, 2011 in corresponding Japanese Patent Application No. 2010-236416.

* cited by examiner

*Primary Examiner* — Anna Momper
(74) *Attorney, Agent, or Firm* — Wenderoth, Lind & Ponack, LLP

(57) ABSTRACT

A piston connected with a piston rod is fitted in a cylinder having a hydraulic fluid sealed therein. A damping force is generated through extension and compression disk valves and an orifice. Vehicle height adjustment is performed with a self-leveling mechanism by transferring the hydraulic fluid between the cylinder and a hydraulic fluid tank. A bladder of the hydraulic fluid tank is clamped between an outer flange portion of a partition member and a casing. Because the hydraulic fluid tank is formed without welding, it is possible to avoid contamination of the hydraulic fluid by welding sputter and thermal deformation. Provision of an O-ring on the outer flange portion can reduce the pressure acting from a reservoir on the clamped portion of the bladder and hence prevent dislodging of the bladder.

15 Claims, 3 Drawing Sheets

HYDRAULIC SHOCK ABSORBER

BACKGROUND OF THE INVENTION

The present invention relates to a hydraulic shock absorber with an automatic vehicle height adjusting mechanism that is installed in a suspension system of a vehicle such as an automobile.

In general, vehicles such as automobiles have a hydraulic shock absorber installed between sprung and unsprung members of a suspension system to damp vibrations of the sprung and unsprung members, thereby improving ride quality and steering stability. However, vehicles having relatively large carrying capacities, e.g. vans and wagons, may be degraded in ride quality and steering stability by a large change in vehicle height due to a change in the carrying load resulting from the occupant getting on or off the vehicle, baggage loading or unloading, and so forth. Further, if the rear wheel-side vehicle height is lowered (rear sagging) by the load carried on the vehicle, the optical axis of the headlight is undesirably directed upward. Accordingly, there has been a demand for a suspension system capable of automatically keeping a constant vehicle height independently of the size of the carrying load.

Under these circumstances, Japanese Patent Application Laid-Open Publication No. Hei 9-144801, for example, proposes a self-leveling hydraulic shock absorber having a pump mechanism that supplies a hydraulic fluid from a hydraulic fluid tank into a cylinder by extension and contraction of a piston rod, and a return mechanism that returns the hydraulic fluid from the pump mechanism and the cylinder to the hydraulic fluid tank according to the extension-contraction position of the piston rod. By utilizing vibrations of the suspension system during running of the vehicle, the pump mechanism and the return mechanism are operated to control the pressure in the cylinder properly to adjust the extending length of the piston rod at a constant level, thereby automatically keeping a constant standard vehicle height.

Further, in the self-leveling hydraulic shock absorber disclosed in Japanese Patent Application Laid-Open Publication No. Hei 9-144801, the hydraulic fluid tank has a hydraulic fluid chamber and a gas chamber isolated from each other by a bladder (flexible diaphragm), thereby reducing the size of the tank in the height direction while surely preventing the gas from mixing into the hydraulic fluid. The hydraulic fluid tank is provided around the outer periphery of an outer tube (casing) below a suspension spring, thereby allowing the necessary volumetric capacity to be ensured by utilizing dead space.

The self-leveling hydraulic shock absorber disclosed in Japanese Patent Application Laid-Open Publication No. Hei 9-144801 suffers, however, from the following problems. When the hydraulic fluid tank is formed, annular members for retaining the bladder, which divides the gas chamber and the hydraulic fluid chamber, are secured to the outer tube by welding. Therefore, sputtering occurring during welding may cause contamination of the hydraulic fluid. In addition, heat of welding may deform the annular members, resulting in degradation of sealing performance.

SUMMARY OF THE INVENTION

The present invention has been made in view of the above-described circumstances. An object of the present invention is to provide a self-leveling hydraulic shock absorber capable of increasing the space efficiency to ensure the necessary capacities of the reservoir and the hydraulic fluid tank while reducing the number of component parts and also capable of avoiding contamination of the hydraulic fluid and thermal deformation, which might otherwise be caused by welding.

The present invention provides a hydraulic shock absorber including a cylinder having a hydraulic fluid sealed therein, a piston slidably fitted in the cylinder, and a piston rod connected at one end thereof to the piston. The other end of the piston rod extends to the outside of the cylinder. The hydraulic shock absorber further includes a damping force generating mechanism that generates a damping force by controlling flow of the hydraulic fluid induced by movement of the piston, a reservoir connected to the cylinder and having the hydraulic fluid and a gas sealed therein, a hydraulic fluid tank that stores the hydraulic fluid, a self-leveling mechanism that adjusts the extending length of the piston rod by transferring the hydraulic fluid between the cylinder and the hydraulic fluid tank in response to extension and contraction of the piston rod, an outer tube provided around the outer periphery of the cylinder to define a chamber between the cylinder and the outer tube, a partition member that divides the chamber into the reservoir and the hydraulic fluid tank, a flexible diaphragm that divides the interior of the hydraulic fluid tank into a hydraulic fluid chamber and a gas chamber, a first hydraulic fluid passage that communicates between one end of the cylinder and the reservoir, and a second fluid passage that communicates between the self-leveling mechanism and the hydraulic fluid chamber of the hydraulic fluid tank.

DETAILED DESCRIPTION OF THE PREFERRED EMBODIMENTS

An embodiment of the present invention will be explained below in detail with reference to the accompanying drawings.

Figure 1:
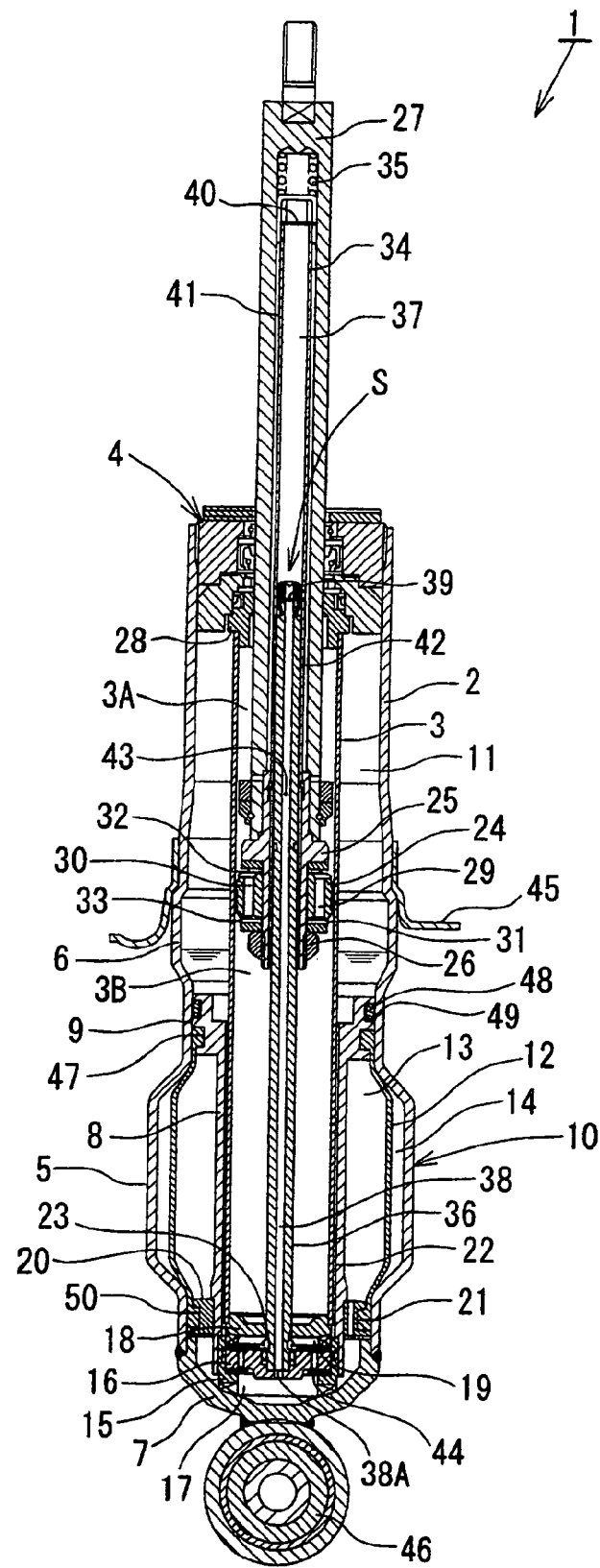
FIG. 1 is a longitudinal sectional view of a hydraulic shock absorber according to an embodiment of the present invention.

As shown in FIG. 1, a hydraulic shock absorber 1 has a dual tube structure in which a cylinder 3 is inserted in a cylindrical casing 2 (outer tube), one end of which is substantially closed. A seal member 4 is fitted in the opening of the casing 2, thereby forming an annular chamber between the casing 2 and the cylinder 3. The lower end of the casing 2 is bulged radially outward by bulging process or the like to form a bulged portion 5. A portion of the casing 2 above the bulged portion 5 is slightly enlarged in diameter to form a spring retainer support portion 6. The bottom of the casing 2 is closed with a cap member 7 welded thereto. A partition member 8 is inserted between the bulged portion 5 of the casing 2 and the cylinder 3. The partition member 8 has an outer flange portion 9 at the upper end thereof. The outer flange portion 9 is fitted to the casing 2 to divide the annular chamber between the casing 2 and the cylinder 3 into a hydraulic fluid tank 10 below the outer flange portion 9 and a reservoir 11 thereabove. The hydraulic fluid tank 10 faces the bulged portion 5.

The interior of the hydraulic fluid tank 10 is divided by a flexible bladder 12 (flexible diaphragm) into a hydraulic fluid chamber 13 at the inner peripheral side and a gas chamber 14 at the outer peripheral side. A hydraulic fluid is sealed in the cylinder 3 and the hydraulic fluid chamber 13 of the hydraulic fluid tank 10. A low-pressure gas is sealed in the gas chamber 14 of the hydraulic fluid tank 10. The hydraulic fluid and a high-pressure gas are sealed in the reservoir 11.

An annular retaining member 15 is interposed between the lower end of the partition member 8 and the cap member 7. A base guide 16 is fitted to the inner periphery of the retaining member 15. A hydraulic fluid chamber 17 is defined between the cap member 7 and the base guide 16. A base member 18 is interposed between the base guide 16 and the lower end of the cylinder 3. A hydraulic fluid chamber 19 is defined between the base guide 16 and base member 18. An annular member 20 is fitted between the lower end of the casing 2 and the partition member 8. The annular member 20 is secured by being clamped between an edge portion of the cap member 7 and a stepped portion on the outer periphery of the partition member 8. The bladder 12 of the hydraulic fluid tank 10 is clamped by the outer flange portion 9 of the partition member 8 and the annular member 20.

The hydraulic fluid chamber 17 between the cap member 7 and the base guide 16 is communicated with the hydraulic fluid chamber 13 of the hydraulic fluid tank 10 through a hydraulic fluid passage 21 provided in the annular member 20. The hydraulic fluid chamber 19 between the base guide 16 and the base member 18 is communicated with the reservoir 11 through an annular hydraulic fluid passage 22 (first hydraulic fluid passage) defined between the cylinder 3 and the partition member 8. The base member 18 forms an orifice 23 (described later) that provides communication between the cylinder 3 and the hydraulic fluid chamber 19 (i.e. the reservoir 11 through the annular hydraulic fluid passage 22).

An annular piston 24 is slidably fitted in the cylinder 3. The piston 24 divides the interior of the cylinder 3 into two chambers, i.e. a cylinder upper chamber 3A and a cylinder lower chamber 3B. One end of a hollow piston rod 27 is connected to the piston 24 by a piston bolt 25 and a nut 26. The other end of the piston rod 27 extends to the outside of the cylinder 3 and the casing 2 through a rod guide 28 and the seal member 4 that are fitted to the upper end portions of the casing 2 and the cylinder 3.

The piston 24 is provided with an extension hydraulic fluid passage 29 and a compression hydraulic fluid passage 30 for communication between the cylinder upper chamber 3A and the cylinder lower chamber 3B. The piston 24 is further provided with a damping force generating mechanism that generates a damping force by controlling the flow of hydraulic fluid through the extension hydraulic fluid passage 29 and the compression hydraulic fluid passage 30. The damping force generating mechanism comprises an extension disk valve 31, a compression disk valve 32, and an orifice 33.

The piston rod 27 is provided with a built-in self-leveling mechanism S that performs vehicle height adjustment by transferring the hydraulic fluid between the cylinder 3 and the reservoir 11 on the one hand and on the other the hydraulic fluid tank 10.

The self-leveling mechanism S will be explained below. The hollow piston rod 27 has a pump tube 34 inserted therein. The pump tube 34 is secured in the hollow piston rod 27 by being held between the piston bolt 25 and a spring 35. A tubular pump rod 36 is disposed in the cylinder 3 to extend along the axis of the latter. The proximal end of the pump rod 36 is inserted through an opening in the base member 18 and connected to the base guide 16. A slight gap is provided between the pump rod 36 and the opening wall of the base member 18 to define the orifice 23 that provides communication between the cylinder lower chamber 3B and the hydraulic fluid chamber 19 (i.e. the reservoir 11). The distal end of the pump rod 36 is slidably fitted in the pump tube 34 to define a pump chamber 37 in the pump tube 34. The pump rod 36 has therein a hydraulic fluid passage 38 that is communicated with the hydraulic fluid chamber 17 through a hydraulic fluid passage 38A (second hydraulic fluid passage) provided in the base guide 16 (and hence communicated with the hydraulic fluid chamber 13 of the hydraulic fluid tank 10 through the hydraulic fluid passage 21).

The pump chamber 37 is communicated with the hydraulic fluid passage 38 in the pump rod 36 through a check valve 39 provided at the distal end of the pump rod 36. The check valve 39 allows only the flow of hydraulic fluid from the hydraulic fluid passage 38 to the pump chamber 37. The pump chamber 37 is further communicated with an annular hydraulic fluid passage 41 formed between the hollow piston rod 27 and the pump tube 34 through a check valve 40 provided at the distal end of the pump tube 34. The hydraulic fluid passage 41 is in communication with the cylinder upper chamber 3A. The check valve 40 allows only the flow of hydraulic fluid from the pump chamber 37 to the hydraulic fluid passage 41.

The side surface of the pump rod 36 is formed with a groove 42 extending axially over a predetermined length from the distal end of the pump rod 36. Normally, the pump chamber 37 is communicated with the cylinder lower chamber 3B through the groove 42. When the piston rod 27 has contracted to a predetermined position, the communication between the groove 42 and the cylinder lower chamber 3B is cut off by the pump tube 34. The side wall of the pump rod 36 is provided with a relief port 43. The relief port 43 is normally closed by the pump tube 34. When the piston rod 27 has extended to a predetermined position, the relief port 43 is uncovered from the pump tube 34 to allow communication between the cylinder lower chamber 3B and the hydraulic fluid passage 38 in the pump rod 36.

The base guide 16 is provided with a normally-closed relief valve 44 that opens when the pressure on the hydraulic fluid chamber 19 side (i.e. the cylinder 3 and reservoir 11 side of high pressure) increases excessively to relieve the pressure to the hydraulic fluid chamber 17 side (i.e. the hydraulic fluid tank 10 side of low pressure).

An annular spring retainer 45 is fitted and secured to the outer periphery of the spring retainer support portion 6 of the casing 2 to retain the lower end of a suspension spring (not shown). The hydraulic shock absorber 1 is installed in a suspension system of a vehicle in such a manner that the distal end of the piston rod 27 is connected to a vehicle body-side member (not shown) and a mounting eye 46 secured to the lower end of the casing 2 is connected to a wheel-side member (not shown). The spring retainer 45 retains the lower end of the suspension spring.

Next, the seal structure of the hydraulic fluid tank 10 will be explained in detail.

The upper end of the bladder 12 is shaped to fit in an outer peripheral groove 47 formed on the outer flange portion 9 of the partition member 8. Thus, the upper end of the bladder 12 is clamped between the outer peripheral groove 47 and the inner peripheral surface of the casing 2 to seal between the reservoir 11 on the one hand and on the other the hydraulic fluid chamber 13 and the gas chamber 14 of the hydraulic fluid tank 10. The outer flange portion 9 of the partition member 8 is extended axially toward the reservoir 11 and formed with an outer peripheral groove 48. An O-ring 49 (seal device) is fitted in the outer peripheral groove 48. The O-ring 49 seals between the casing 2 and the outer flange portion 9. The lower end of the bladder 12 is shaped to fit in an outer peripheral groove 50 formed on the annular member 20. Thus, the lower end of the bladder 12 is clamped between the outer peripheral groove 50 and the inner peripheral surface of the casing 2 to seal between the hydraulic fluid chamber 13 and the gas chamber 14.

The following is an explanation of the operation of this embodiment arranged as stated above.

The sliding movement of the piston 24 in the cylinder 3 caused by the extension and contraction of the piston rod 27 induces flow of hydraulic fluid between the cylinder upper and lower chambers 3A and 3B through the extension and compression hydraulic fluid passages 29 and 30. The flow of hydraulic fluid is controlled by the extension and compression disk valves 31 and 32 and the orifice 33, thereby generating a damping force. At this time, a volumetric change in the cylinder 3 due to the entry and withdrawal of the piston rod 27 into and from the cylinder 3 is compensated for by the compression and expansion of the gas in the reservoir 11.

Next, the vehicle height adjusting function of the hydraulic shock absorber 1 will be explained.

Generally, when the vehicle is empty, the extending length of the piston rod 27 is within a predetermined standard range. In this state, the pump chamber 37 is in communication with the cylinder lower chamber 3B through the groove 42 of the pump rod 36. Therefore, no pumping operation is carried out even if the piston rod 27 extends or contracts. Thus, the vehicle height is kept as it is.

When the vehicle height is lowered due, for example, to an increase in the carrying load and consequently the extending length of the piston rod 27 falls below the predetermined standard range, the groove 42 is cut off from communication with the cylinder lower chamber 3B by the pump tube 34. In this state, if the piston rod 27 extends and contracts during running of the vehicle, the pumping operation takes place as follows. During the extension stroke, the pump rod 36 retracts relative to the piston rod 27, and the pump chamber 37 expands to reduce the pressure therein. Consequently, the check valve 39 opens to allow the hydraulic fluid in the hydraulic fluid chamber 13 of the hydraulic fluid tank 10 to be introduced into the pump chamber 37 through the hydraulic fluid passage 21, the hydraulic fluid chamber 17, the hydraulic fluid passage 38A and the hydraulic fluid passage 38. During the compression stroke, the pump rod 36 advances relative to the piston rod 27, and the pump chamber 37 contracts to increase the pressure therein. Consequently, the check valve 40 opens to allow the hydraulic fluid to be supplied from the pump chamber 37 to the cylinder lower chamber 3B through the hydraulic fluid passage 41, thereby increasing the extending length of the piston rod 27. In this way, the pumping operation is repeated by extension and contraction of the piston rod 27 during running of the vehicle, thereby increasing the extending length of the piston rod 27 to raise the vehicle height. When the vehicle height reaches the predetermined standard range, the pump chamber 37 is communicated with the cylinder lower chamber 3B through the groove 42 as stated above, and the pumping operation is canceled.

When the vehicle height is raised due, for example, to a decrease in the carrying load and consequently the extending length of the piston rod 27 exceeds the predetermined standard range, the relief port 43 of the pump rod 36 is uncovered from the pump tube 34 to allow communication between the cylinder lower chamber 3B and the hydraulic fluid passage 38 through the relief port 43. Thus, some of the hydraulic fluid in the cylinder lower chamber 3B is returned to the hydraulic fluid chamber 13 of the hydraulic fluid tank 10, thereby allowing the extending length of the piston rod 27 to be reduced to lower the vehicle height. When the vehicle height is lowered and consequently the extending length of the piston rod 27 is reduced to fall within the predetermined standard range, the relief port 43 is cut off from communication with the cylinder lower chamber 3B by the pump tube 34, and the vehicle height is kept at the present level.

Thus, the extending length of the piston rod 27 is adjusted to fall within the predetermined standard range by repeating the pumping operation and the hydraulic fluid returning operation utilizing extension and contraction of the piston rod 27 during running of the vehicle, thereby allowing the vehicle height to be automatically adjusted to a constant level independently of the carrying load.

The hydraulic fluid tank 10 has the hydraulic fluid chamber 13 and the gas chamber 14 isolated from each other by the bladder 12, thereby reducing the size in the height direction while surely preventing the gas from mixing into the hydraulic fluid. Thus, the hydraulic fluid tank 10 can be disposed below the suspension spring supported by the spring retainer 45. In addition, because the casing 2 has the bulged portion 5, the volumetric capacity can be sufficiently increased. Thus, the space efficiency can be increased by effectively utilizing dead space. It should be noted that the reservoir 11 is disposed above the hydraulic fluid tank 10 and communicated with the cylinder 3 through the annular hydraulic fluid passage 22. Therefore, the fluid level can be kept sufficiently high, so that it is possible to prevent the gas from mixing into the hydraulic fluid. Further, the gas chamber 14 of the hydraulic fluid tank 10 is sealed with the bladder 12. Therefore, if the atmospheric air is sealed in the gas chamber 14 as a low-pressure gas at the time of assembling, the manufacturing process can be simplified.

Because the hydraulic fluid tank 10 is formed by the bulged portion 5 of the casing 2, the number of components can be reduced in comparison to the related art disclosed in Japanese Patent Application Laid-Open Publication No. Hei 9-144801. Accordingly, it is possible to reduce the number of man-hours needed to produce the hydraulic shock absorber and the manufacturing cost. Further, because the hydraulic fluid tank 10 is formed not by welding but by clamping the bladder 12 with the partition member 8 and the annular member 20, the hydraulic shock absorber of the present invention is free from the problems of contamination of the hydraulic fluid by sputtering during welding and deformation by heat of welding.

The interface between the hydraulic fluid tank 10 and the reservoir 11 is sealed with the O-ring 49 in addition to the upper end of the bladder 12. Therefore, the pressure in the reservoir 11, which is raised to a high pressure by pumping, does not act directly on the upper end of the bladder 12. Accordingly, it is possible to ensure the desired sealing performance and to prevent the bladder 12 from being dislodged, which might otherwise be caused by the high pressure.

Next, modifications of the foregoing embodiment will be explained with reference to FIGS. 2 to 5. It should be noted that in the modifications the same constituent elements as those of the foregoing embodiment are denoted by the same reference numerals as used in the embodiment, and only parts in which the modifications differ from the embodiment will be explained in detail.

Figure 2:
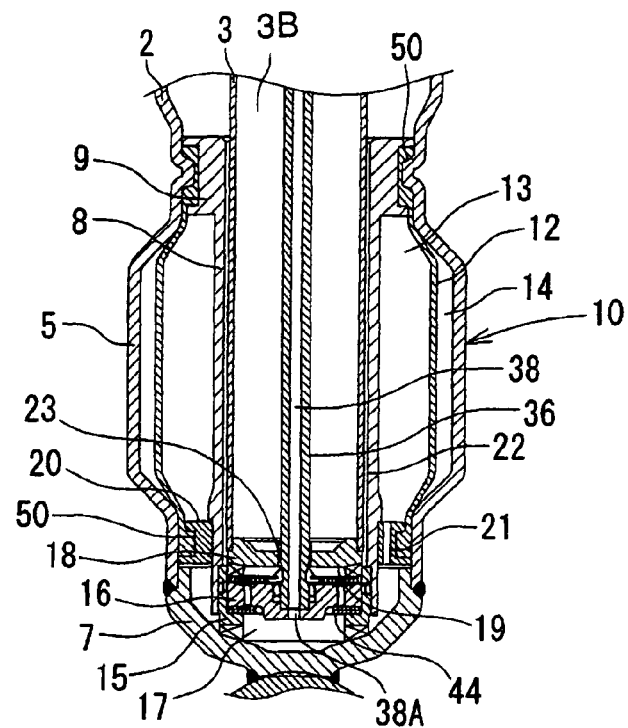
FIG. 2 is an enlarged longitudinal sectional view of an important part of a modification of the hydraulic shock absorber shown in FIG. 1.

In the modification shown in FIG. 2, the outer peripheral groove 48 and the O-ring 49 are omitted, and instead the outer peripheral groove 47, which is fitted with the upper end of the bladder 12, is extended in the axial direction. After the partition member 8 and the bladder 12 have been assembled into the casing 2, the casing 2 is deformed or caulked from the outer peripheral side thereof so that the resulting deformed or caulked portion 50 engages into the upper end of the bladder 12. With this structure, two seals are respectively formed at the axially opposite sides of the caulked portion 50 by the bladder 12, thereby improving the sealing performance. In addition, the bladder 12 can be clamped even more firmly.

Figure 3:
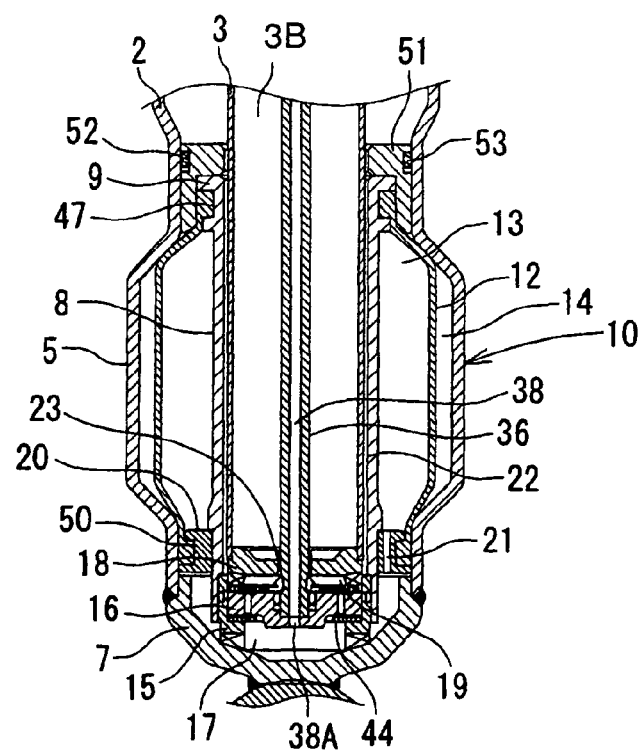
FIG. 3 is an enlarged longitudinal sectional view of an important part of another modification of the hydraulic shock absorber shown in FIG. 1.

In the modification shown in FIG. 3, an annular seal member 51 is provided. The annular seal member 51 is fitted between the outer flange portion 9 of the partition member 8 and the outer periphery of the upper end of the bladder 12 on the one hand and on the other the inner peripheral surface of the casing 2 and abuts against the upper end of the partition member 8. An outer peripheral groove 52 is formed on the outer peripheral portion of the seal member 51 that is fitted to the casing 2. An O-ring 53 is fitted in the outer peripheral groove 52. Thus, the interface between the reservoir 11 and the hydraulic fluid tank 10 is sealed with the O-ring 53 and the upper end of the bladder 12, and the seal length is increased by the seal member 51, thereby reducing the pressure in the reservoir 11 that acts on the upper end of the bladder 12 and thus preventing dislodging of the bladder 12.

Figure 4:
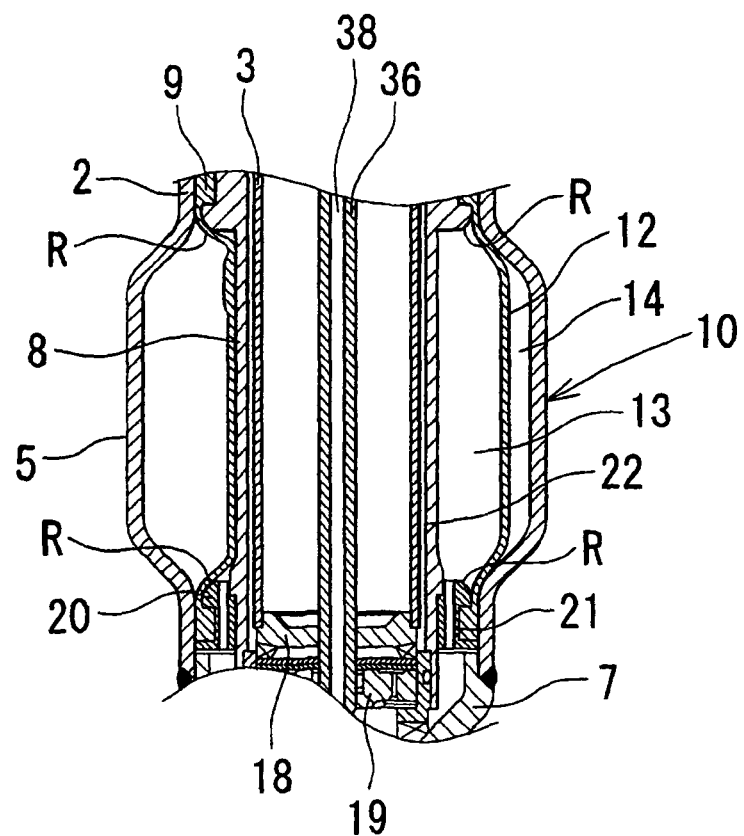
FIG. 4 is an enlarged longitudinal sectional view of an important part of still another modification of the hydraulic shock absorbers shown in FIGS. 1 to 3.
Figure 5:
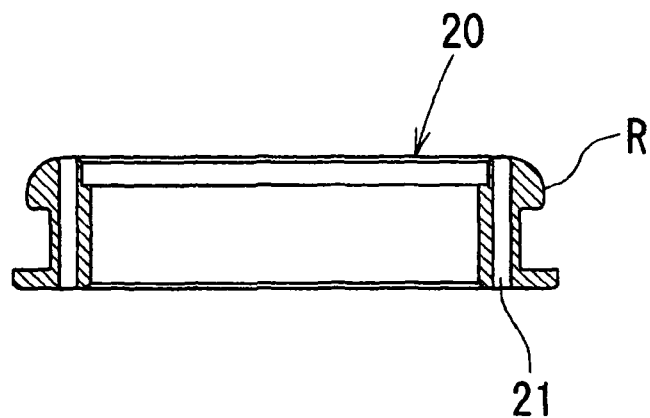
FIG. 5 is an enlarged longitudinal sectional view of an annular member in the modification shown in FIG. 4.

It should be noted that the embodiments shown in FIGS. 1 to 3 may be modified as follows. As shown in FIGS. 4 and 5, the outer peripheral edge at the lower end of the outer flange portion 9 of the partition member 8, which clamps the bladder 12, is rounded as indicated by R, and so is the outer peripheral edge at the upper end of the annular member 20. With this structure, when the bladder 12 is deformed radially inward as shown in the left part of FIG. 4, the bladder 12 is supported by the rounded edges R and will not abut against any angular edges. Accordingly, the durability of the bladder 12 can be improved.

According to the foregoing embodiments, a hydraulic shock absorber with a self-leveling mechanism has a reservoir provided in the upper part of an annular chamber formed between an outer tube and a cylinder and a hydraulic fluid tank in the lower part of the annular chamber. This structure allows a reduction in the number of parts to be welded. Because the reservoir is provided in the upper part of the annular chamber, the fluid level can be kept sufficiently high, so that it is possible to prevent the gas from mixing into the hydraulic fluid. Because the hydraulic fluid tank is provided in the lower part of the annular chamber and the hydraulic fluid chamber and the gas chamber are separated from each other by a flexible diaphragm, it is possible to reduce the size of the tank in the height direction while preventing mixing of the gas into the hydraulic fluid. Thus, the space efficiency can be increased.

In addition, the pressure acting from the reservoir on the retained portion of the flexible diaphragm can be reduced by the seal device.

In addition, the interface between the reservoir and the hydraulic fluid tank can be sealed in two stages with the clamped portion of the flexible diaphragm and the seal device.

Further, because it is unnecessary to perform a special process for sealing a gas in the gas chamber of the hydraulic fluid tank, assembly can be simplified.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-28248, filed on Feb. 7, 2007.

The entire disclosure of Japanese Patent Application No. 2007-28248, filed on Feb. 7, 2007 including specification, claims, drawings and summary is incorporated herein by reference in its entirety.

What is claimed is:

1. A hydraulic shock absorber comprising:
   a cylinder having a hydraulic fluid sealed therein;
   a piston slidably fitted in the cylinder;
   a piston rod connected at one end thereof to the piston, the other end of the piston rod extending to an outside of the cylinder;
   a damping force generating mechanism that generates a damping force by controlling flow of the hydraulic fluid induced by movement of the piston;
   a reservoir connected to the cylinder and having the hydraulic fluid and a gas sealed therein such that the hydraulic fluid and the gas are in direct contact;
   a hydraulic fluid tank that stores the hydraulic fluid;
   a self-leveling mechanism that adjusts an extending length of the piston rod by transferring the hydraulic fluid between the cylinder and the hydraulic fluid tank by extension and contraction of the piston rod;
   an outer tube provided around an outer periphery of the cylinder to define a chamber between the cylinder and the outer tube;
   a partition member that divides the chamber into the reservoir and the hydraulic fluid tank;
   a flexible diaphragm that divides an interior of the hydraulic fluid tank into a hydraulic fluid chamber and a gas chamber;
   a first hydraulic fluid passage that communicates between one end of the cylinder and the reservoir, wherein the first hydraulic fluid passage communicates between a wheel-side end of the cylinder and the reservoir; and
   a second fluid passage that communicates between the self-leveling mechanism and the hydraulic fluid chamber of the hydraulic fluid tank,
   wherein the reservoir is adapted to be positionable at a vehicle body side, while the hydraulic fluid tank is adapted to be positionable at a wheel side.

2. The hydraulic shock absorber of claim 1, wherein the first hydraulic fluid passage is an annular passage between an outer peripheral surface of the cylinder and an inner peripheral surface of the partition member.

3. The hydraulic shock absorber of claim 2, which has a dual tube structure in which the cylinder is inserted in the outer tube;
   the outer tube having a bulged portion at a wheel-side end thereof, the bulged portion being bulged radially outward;
   wherein the partition member is inserted between the bulged portion of the outer tube and the cylinder to divide the reservoir and the hydraulic fluid tank.

4. The hydraulic shock absorber of claim 1, wherein the flexible diaphragm is retained by the partition member to form a retained portion on the flexible diaphragm, the hydraulic shock absorber further comprising: a seal device that seals the retained portion of the flexible diaphragm from the reservoir.

5. The hydraulic shock absorber of claim 4, wherein the flexible diaphragm is clamped between the partition member and the outer tube to form a clamped portion on the flexible diaphragm;

the seal device being provided at the reservoir side of the clamped portion of the flexible diaphragm between the partition member and the outer tube.

6. The hydraulic shock absorber of claim 5, wherein the partition member has an outer flange portion at an end thereof closer to the reservoir, the outer flange portion projecting toward the outer tube;
the outer flange portion having an outer peripheral groove;
the flexible diaphragm having a reservoir-side end shaped to fit in the outer peripheral groove;
wherein the reservoir-side end of the flexible diaphragm is clamped between the outer peripheral groove and an inner peripheral surface of the outer tube to form the clamped portion, so that the clamped portion seals between the reservoir and the hydraulic fluid tank.

7. The hydraulic shock absorber of claim 6, wherein the seal device includes:
an extended portion formed on the outer flange portion of the partition member, the extended portion being extended axially toward the reservoir;
an outer peripheral groove formed on a side of the extended portion that faces the inner peripheral surface of the outer tube; and
an O-ring fitted in the outer peripheral groove of the extended portion, so that the O-ring seals between the outer tube and the outer flange portion.

8. The hydraulic shock absorber of claim 7, further comprising:
a cap member that closes a wheel-side end of the outer tube; and
an annular member fitted between the wheel-side end of the outer tube and the partition member, the annular member being retained by an edge of the cap member, a stepped portion on an outer periphery of the partition member, and a cap member-side end portion of the outer tube;
wherein a cap member-side end of the flexible diaphragm is shaped to fit in an outer peripheral groove formed on the annular member, the cap member-side end of the flexible diaphragm being clamped between the outer peripheral groove and the inner peripheral surface of the outer tube to seal between the hydraulic fluid chamber and the gas chamber.

9. The hydraulic shock absorber of claim 8, wherein an outer peripheral edge of the annular member that is closer to the hydraulic fluid tank is rounded.

10. The hydraulic shock absorber of claim 6, wherein an outer peripheral edge of the outer flange portion of the partition member clamping the flexible diaphragm that is closer to the hydraulic fluid tank is rounded.

11. The hydraulic shock absorber of claim 4, wherein the partition member has an outer flange portion at an end thereof closer to the reservoir, the outer flange portion projecting toward the outer tube;
the seal device including:
the outer flange portion of the partition member;
an extended portion formed on the outer flange portion of the partition member, the extended portion being extended axially toward the reservoir;
an axially extending outer peripheral groove formed on the outer flange portion and the extended portion;
a reservoir-side end of the flexible diaphragm fitted in the outer peripheral groove; and
a caulked portion formed on the outer tube by pressing the outer tube, together with the flexible diaphragm, radially inward toward the reservoir-side end of the flexible diaphragm fitted in the outer peripheral groove;
wherein the caulked portion provides two seals respectively formed at axially opposite sides of the caulked portion by the flexible diaphragm.

12. The hydraulic shock absorber of claim 4, wherein the partition member has an outer flange portion at an end thereof closer to the reservoir, the outer flange portion projecting toward the outer tube, the outer flange portion having an outer peripheral groove;
the flexible diaphragm having a reservoir-side end shaped to fit in the outer peripheral groove, the reservoir-side end of the flexible diaphragm being fitted in the outer peripheral groove;
the seal device including:
an annular seal member abutting against a reservoir-side end of the partition member, the seal member being fitted between the outer flange portion of the partition member and an outer periphery of the reservoir-side end of the flexible diaphragm on one hand and on the other an inner peripheral portion of the outer tube;
an outer peripheral groove formed on an outer peripheral portion of the seal member that is fitted to the outer tube; and
an O-ring fitted in the outer peripheral groove, so that the O-ring seals between the reservoir and the hydraulic fluid tank.

13. The hydraulic shock absorber of claim 12, wherein the reservoir-side end of the flexible diaphragm fitted in the outer peripheral groove also seals between the reservoir and the hydraulic fluid tank.

14. The hydraulic shock absorber of claim 3, wherein the gas chamber is defined between the bulged portion and the flexible diaphragm, and the hydraulic fluid chamber is defined between the flexible diaphragm and the partition member.

15. The hydraulic shock absorber of claim 1, wherein atmospheric air is sealed in the gas chamber of the hydraulic fluid tank when the hydraulic fluid tank is assembled.

* * * * *